Figure 1:
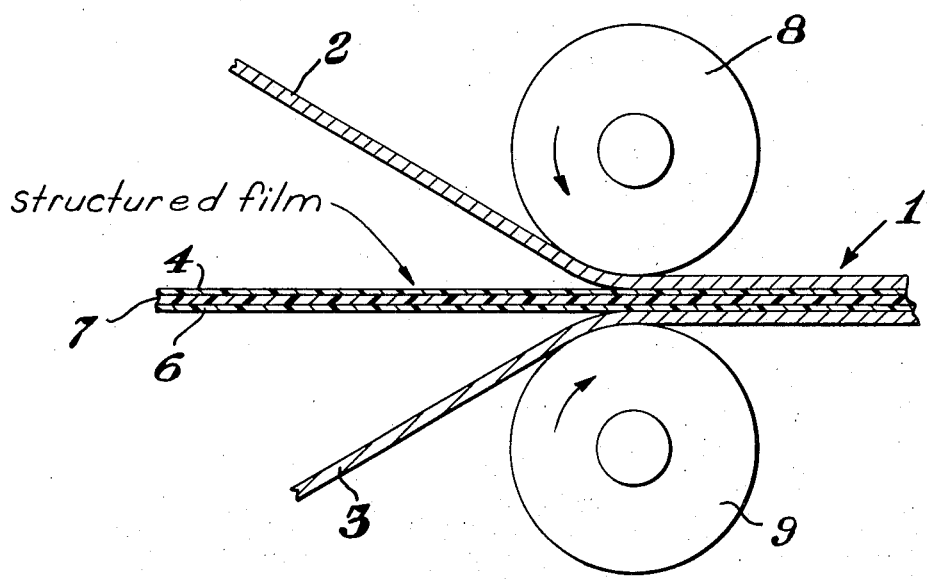

United States Patent [19]
Colburn

[11] 3,721,597
[45] March 20, 1973

[54] BONDING METAL LAMINAE WITH THERMOPLASTIC FILM

[75] Inventor: Lyle W. Colburn, Midland, Mich.

[73] Assignee: The Dow Chemical Company, Midland, Mich.

[22] Filed: May 2, 1969

[21] Appl. No.: 821,339

[52] U.S. Cl. .................156/309, 156/313, 156/332, 156/334
[51] Int. Cl. ...............................................C09j 5/06
[58] Field of Search.............156/309, 332, 313, 334; 260/80.8, 80.81

[56] References Cited

UNITED STATES PATENTS

| | | | |
|---|---|---|---|
| 3,551,270 | 12/1970 | Sharkey | 156/313 X |
| 2,788,306 | 4/1957 | Cox et al. | 156/309 X |
| 3,215,678 | 11/1965 | Adelman | 260/80.8 |
| 3,249,570 | 5/1966 | Potts et al. | 260/80.8 X |
| 3,311,862 | 3/1967 | Rees | 156/309 X |
| 3,442,745 | 5/1969 | Salyer et al. | 156/332 |
| 3,481,812 | 12/1969 | Holub et al. | 156/306 |
| 3,485,785 | 12/1969 | Anspor et al. | 260/29.6 |
| 3,519,531 | 7/1970 | James et al. | 161/254 |

FOREIGN PATENTS OR APPLICATIONS 1,091,855  10/1960  Germany..............156/313

Primary Examiner—Carl D. Quarforth
Assistant Examiner—E. A. Miller
Attorney—Griswold and Burdick, Ralph M. Mellom and L. J. Dankert

[57] ABSTRACT

A laminate of two metal laminae is produced by disposing between two metal laminae a structured film comprising an inner layer of a thermoplastic material positioned between two layers of an adhesive thermoplastic material and applying heat and pressure to the metal laminae of sufficient magnitude to effect a bond between the adhesive layers and the metal laminae but of insufficient magnitude to destroy the integrity of the inner layer in the structured film. The inner thermoplastic layer in the structured film has a melting point at least about 25° F. greater than the melting point of the adhesive layers. In the practice of this method, metal laminae of aluminum strips can be bonded together with an adhesive thermoplastic such as a copolymer of ethylene and acrylic acid. The inner layer is fashioned of a material such as high density polyethylene. The laminate produced by this method is characterized by being free of metal-to-metal contact of the metal laminae. Laminates produced by this method have utility in a variety of fields including packaging and construction.

9 Claims, 2 Drawing Figures

PATENTED MAR 20 1973   3,721,597

INVENTOR.
Lyle W. Colburn
BY Ralph M. Mellom
ATTORNEY

BONDING METAL LAMINAE WITH THERMOPLASTIC FILM

This invention relates to the art of lamination. In one aspect, this invention relates to methods of bonding metal strips or sheets together with an adhesive thermoplastic to produce a laminated article. In another aspect, this invention relates to methods of controlling the space between metal strips when they are laminated together.

The laminating art is replete with various and sundry techniques for bonding two or more sheets or strips together. One exemplary method for bonding two metal strips of indeterminate lengths involves passing the metal strips along with an adhesive strip disposed between them into the nip formed between one or more pairs of opposed laminating rolls. Heat and pressure is imparted to the outer surfaces of the metal strips to cause the adhesive layer to form a strong bond between the strips. Another and somewhat related technique for producing laminates of two or more metal sheets involves forming a composite by stacking the metal sheets with an adhesive sheet between them and then subjecting the composite to elevated temperature and pressure such as between the platens of a hydraulic press or the like. In the practice of both of these techniques, the heat and pressure applied to the outer surfaces of the metal sheets or strips must be carefully controlled to achieve the desired degree of adhesion between the metal layers. For example, if too much heat and/or pressure is applied, the adhesive is squeezed out from between the sheets and metal-to-metal contact results. The metal-to-metal contact is undesirable for at least two reasons. First, when the metal-to-metal contact is extensive in area the bond between the metal layers is very low and in some cases there may actually be no bond. Second, the metal-to-metal contact may result in a corrosive environment due to the galvanic action between the metals, particularly when the metal laminae are fashioned of dissimilar metals. Metal-to-metal contact is also undesirable when the laminated product is intended to dampen noise such as in the construction of furnace ducts and the like because the sound attenuation properties of the adhesive are no longer present when the adhesive has been squeezed out from between the metal layers.

While attempts have been made to insure the presence of a continuous adhesive layer between the metal layers, such as by applying less pressure to the outer surfaces of the metal layers or by using an excess quantity of adhesive material to compensate for the amount squeezed out from between the metal layers, neither of these corrective measures have been satisfactory because when less pressure is applied the bond between the metal layers is greatly reduced and when larger quantities of adhesive are used the cost becomes excessive.

According to this invention, these and other disadvantages of the prior art techniques for laminating two or more metal laminae together with an adhesive are overcome by employing a structured film comprising at least two outer adhesive layers and at least one inner layer of a thermoplastic material between the adhesive layers and characterized by having a melting point higher than the melting point of the adhesive layers. The structured film is disposed between two metal laminae which are to be laminated and heat and pressure are applied to the outer surfaces of the laminae. The heat and pressure applied are of sufficient magnitude to cause a bond to form between the outer adhesive layers and the metal layers but is of insufficient magnitude to destroy the integrity of the inner layer of thermoplastic material which is disposed between the adhesive layers. As will be more fully hereinafter described, the structured film employed in the practice of this invention allows the application of sufficient heat and pressure consistent with the formation of a strong bond between the metal layers and at the same time controls the spacing between the metal layers.

Accordingly, it is an object of this invention to produce a laminate of two or more metal laminae characterized by being free of metal-to-metal contact of the metal laminae.

Another object of this invention is to control the space between metal laminae when they are bonded together.

A further object of this invention is to provide a laminate of metal laminae which is free of galvanic corrosion between the metal laminae.

Yet another object of this invention is to provide a laminate having substantially uniform noise dampening properties.

Figure 2:
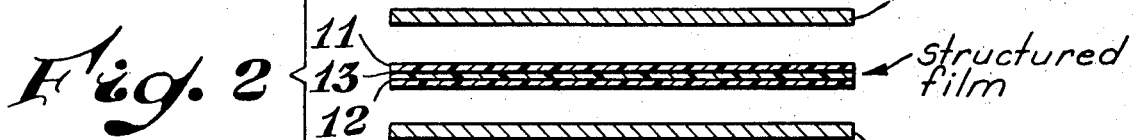
Figure 2:
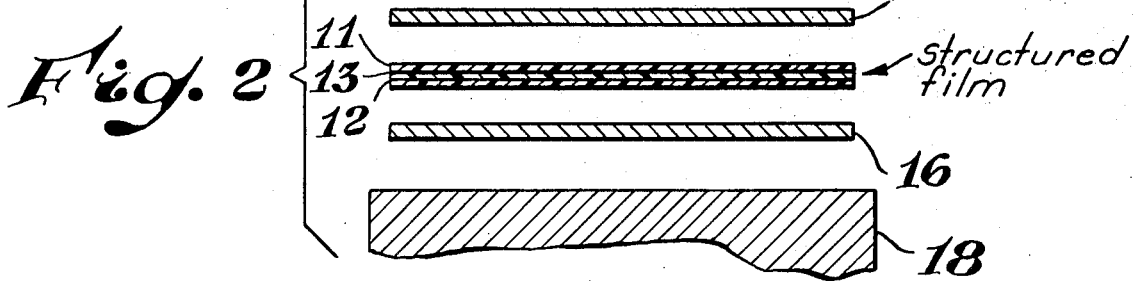

These and other objects of the invention will become apparent to one skilled in the art after studying the following detailed description, the appended claims, and the accompanying drawing wherein:

FIG. 1 is a schematic illustration of the use of a pair of opposed laminating rolls for producing a laminate according to one embodiment of the invention; and FIG. 2 is an exploded view showing the use of opposed platens in a press for producing a laminate according to another embodiment of the invention.

In practicing the method of this invention, a laminate comprising metal laminae bonded together with an adhesive thermoplastic material and characterized by being free of metal-to-metal contact of the metal laminae is produced by disposing between at least two metal laminae a structured film comprising at least two adhesive layers and an inner layer of a thermoplastic material positioned between each of the adhesive layers. The inner layer in the structured film has a melting point at least about 25° F. greater than the melting point of the adhesive layers. The resulting composite of metal laminae having the structured film disposed between them is then passed to a bonding zone wherein heat and pressure are applied to the exposed surfaces of the metal laminae. The heat and pressure which are applied to the composite are of sufficient magnitude to effect a bond between the outer adhesive layers and the metal laminae but are of insufficient magnitude to destroy the integrity of the inner layer of thermoplastic material which is disposed between the adhesive layers in the structured film. As used herein, the term "bonding zone" is intended to include means for applying heat and/or pressure separately or simultaneously to the metal laminae and/or to the structured film.

The heat and pressure can be applied to the outer surfaces of the metal laminae of the composite by any suitable and convenient technique. One exemplary technique for effecting a bond between the adhesive layers of the structured film and the metal laminae is to pass the composite to a bonding zone comprising the nip formed between a pair of opposed laminating rolls. One or both of the laminating rolls can be heated for the purpose of imparting the desired amount of heat to the structured film. The laminating rolls are preferably adjustable and/or spring biased to allow the desired amount of pressure to be applied to the composite as it passes between the rolls. In another embodiment of the invention, the heat can be applied to the metal laminae before they are passed between the laminating rolls such as by passing them in close proximity to gas burners, electric resistance elements, or the like. In this modification, the laminating rolls can be operated at ambient temperature or they can be heated or cooled by suitable means, if desired.

Another technique for effecting a bond between the adhesive layers of the structured film and the metal laminae employs a bonding zone comprising the opposed platens of a hydraulic press or the like. The use of a hydraulic press is generally preferred when the laminate is made from short sheets of metal laminae and a sheet of the structured film. The use of a pair of opposed laminating rolls to effect a bond between the adhesive layers of the structured film and the metal laminae is generally preferred when the laminate is made from metal laminae of indeterminate lengths supplied from mill roll coils or the like.

While the advantages obtained by using a structured film are realized regardless of the actual technique which is employed for producing the laminate, the results obtained with the structured film are particularly beneficial when the laminate is formed with laminating rolls because of the high laminating speeds usually associated with this type operation and because the variables of heat, pressure, spacing, speed, etc. cannot be controlled as easily and with the same degree of accuracy as they can be controlled in other laminating operations. Thus, the structured film of this invention allows laminates to be produced with larger margins of error in the variables mentioned above without sacrificing the quality of the laminate. The inner layer disposed between the two adhesive layers in the structured film is selected such that it maintains its integrity during the laminating operation which can be conducted at temperatures and pressures which will insure the formation of a uniform and strong bond between the outer adhesive layers and the metal laminae. That is, the laminating operation can be conducted at a temperature and pressure which will cause the outer adhesive layers in the structured film to become soft and tacky and in some cases to melt and thereby completely wet the surface of the adjoining metal laminae and form a strong bond with them under the influence of the pressure applied. During this transformation of the adhesive layers, the integrity of the structured film is preserved thus assuring controlled spacing between the metal laminae and the avoidance of chance metal-to-metal contact.

This degree of uniformity cannot be achieved when the adhesive layer is disposed between the metal laminae by the prior art techniques such as by positioning a single layer of adhesive between the metal laminae because the single layer will melt and flow under the influence of the heat and pressure thereby causing metal-to-metal contact. As previously indicated, the metal-to-metal contact is undesirable for many reasons including galvanic corrosion which is likely to occur in these areas and when the metal-to-metal contact area is large, because the absence of a bond in these areas is undesirable.

Referring now to the drawing, the invention will be described in more detail. Many controls, switches, heating elements, pressure gauges, and the like, not necessary in explaining the invention to one skilled in the art, has been omitted from the drawing for the sake of clarity.

In FIG. 1, a laminate shown generally by reference numeral 1 is produced according to one embodiment of the invention by disposing a structured film between metal laminae 2 and 3. The structured film comprises outer adhesive layers 4 and 6 and an inner layer 7 of a thermoplastic material characterized by having a melting point at least about 25 Fahrenheit degrees greater than the melting point of the adhesive layers 4 and 6.

Heat and pressure are applied to the outer surfaces of the metal laminae 2 and 3 by passing the metal laminae and the structured film through the nip formed by a pair of opposed laminating rolls 8 and 9. The heat and pressure are applied to the metal laminae and the structured film in amounts sufficient to effect a bond between the adhesive layers 4 and 6 and the metal laminae 2 and 3, respectively, but in amounts insufficient to destroy the integrity of the inner layer 7. This is accomplished by heating one or both of the laminating rolls 8 and 9 or by preheating metal laminae and by adjusting the nip formed between them while taking into consideration the thickness of the metal laminae 2 and 3 and the thickness of the structured film.

As previously indicated, in the practice of the method according to the description of FIG. 1, the heat and pressure imparted to the metal laminae 2 and 3 by the laminating rolls 8 and 9 can be controlled to cause adhesive layers 4 and 6 to form a strong bond with the metal laminae 2 and 3 while at the same time preserving the integrity of the inner layer 7.

In FIG. 2 of the drawing, a structured film in the form of a sheet comprising two outer adhesive layers 11 and 12 and an inner layer 13 of a thermoplastic material is disposed between metal sheets 14 and 16. The resulting composite is placed between platens 17 and 18 of a hydraulic press (not shown) to impart heat and pressure to metal sheets 14 and 16 and the structured film. The inner layer 13 of the structured film has a melting point at least about 25 Fahrenheit degrees greater than the melting point of the adhesive layers 11 and 12. The heat and pressure imparted by platens 17 and/or 18 are of sufficient magnitude to effect a bond between the adhesive layers 11 and 12 and metal sheets 14 and 16 respectively, but are of insufficient magnitude to destroy the integrity of the inner layer 13.

As indicated with respect to FIG. 1, the inner layer 13 of the structured film employed in the practice of the invention illustrated by FIG. 2 provides a controlled spacing between metal sheets 14 and 16. The inner layer 13 also prevents metal-to-metal contact between metal sheets 14 and 16.

In the practice of this invention, the inner layer of thermoplastic material in the structured film is selected such that it has a melting point at least about 25° F. greater than the melting point of the outer adhesive layers and preferably at least about 50° F. greater than the melting point of the adhesive layers. Exemplary materials which can be used as the inner layer in the structured film include high density polyethylene, polypropylene, copolymers of ethylene and propylene, nylon 6, nylon 66, chlorinated polyethylene, and the like. While some materials suitable for use in fabricating the inner layer of the structured film may not form a suitable bond with the adhesive layers, they can be used along with an adhesive in the form of a glue line between the inner layer and the adhesive layer to provide the bond desired.

The adhesive layers in the structured film can be any suitable adhesive plastic materials characterized by having a melting point at least about 25° F. lower than the melting point of the inner layer in the structured film and preferably at least about 50° F. lower than the melting point of the inner layer. The composition of the adhesive layers in the structured film can be the same or different. Exemplary adhesives useful in the practice of this invention are fashioned of materials selected from the group consisting of copolymers containing between about 60 and about 99.5 weight percent combined $\alpha$-olefin having up to and including six carbon atoms per molecule, between about 0.5 and about 25 weight percent combined $\alpha,\beta$-ethylenically unsaturated carboxylic acid having up to and including eight carbon atoms per molecule, and up to about 39.5 weight percent of a material selected from the group consisting of alkyl esters of an $\alpha,\beta$-ethylenically unsaturated carboxylic acid having up to and including eight carbon atoms per molecule wherein the alkyl moiety of the ester contains up to and including eight carbon atoms and vinyl esters of a saturated carboxylic acid having up to and including eight carbon atoms per molecule.

Exemplary $\alpha$-olefins which can be polymerized with an $\alpha,\beta$-ethylenically unsaturated carboxylic acid to produce the adhesive include ethylene, propylene, 1-butene, 1-pentene, methyl propene, 4-methyl-1-pentene, and the like. The adhesive can be a random copolymer formed by copolymerizing the $\alpha$-olefin with the $\alpha,\beta$-ethylenically unsaturated carboxylic acid or it can be a graft copolymer obtained by grafting the $\alpha,\beta$-ethylenically unsaturated carboxylic acid onto a suitable polyolefin.

Exemplary $\alpha,\beta$-ethylenically unsaturated carboxylic acids which can be copolymerized with the $\alpha$-olefin or grafted onto the polyolefin to produce the adhesive include acrylic, methacrylic, ethacrylic, crotonic, isocrotonic, tiglic, angelic, senecioic, hexenic, tetracrylic and the like.

Exemplary alkyl esters of $\alpha,\beta$-ethylenically unsaturated carboxylic acid which can be copolymerized with the $\alpha$-olefin and the $\alpha,\beta$-ethylenically unsaturated carboxylic acid include methyl methacrylate, ethyl methacrylate, methyl ethacrylate, methyl angelate, ethyl senecioate and the like. The copolymer adhesive used in forming the structured film can have as a third monomer in addition to the $\alpha$-olefin and the $\alpha,\beta$-ethylenically unsaturated carboxylic acid a vinyl ester of a saturated carboxylic acid having up to and including eight carbon atoms per molecule. Exemplary vinyl esters of such acids include vinyl acetate, vinyl propionate, vinyl butyrate, vinyl caprylate and the like. Exemplary adhesives which can be used to fabricate the adhesive layers in the structured film include copolymers containing 99.5 weight percent olefin and 0.5 weight percent acid; 75 weight percent olefin and 25 weight percent acid; 60 weight percent olefin, 39.5 weight percent ester of an acid, and 0.5 weight percent acid; 60 weight percent olefin, 15 weight percent ester of an acid, and 25 weight percent acid; and 80 weight percent olefin, 12 weight percent ester of an acid, and 8 weight percent acid. Copolymers containing between about 75 and about 95.5 weight percent ethylene and between about 0.5 and about 25 weight percent acrylic acid are particularly suitable for fabricating the adhesive layers in the structured film. A preferred adhesive comprises a copolymer of ethylene containing about 8 weight percent combined acrylic acid.

The structured film can be fabricated by a variety of suitable techniques. One exemplary technique for producing the structured film is to co-extrude the higher melting point inner layer along with a suitable adhesive to produce two adhesive layers, one on each side of the inner layer. Other techniques for producing the structured film can be used if desired.

The structured film can be of any suitable and convenient thickness dictated by such factors as the thickness of the metal laminae, the amount of spacing desired between the metal laminae, the degree of bond desired, economics, and the like. The inner layer of the structured film usually has the thickness of at least about 0.25 mil and preferably at least about 0.5 mil with no practical upper limit. The adhesive layers in the structured film usually each have a thickness of at least about 0.25 mil and preferably at least about 0.5 mil with an upper limit of about 25 mils. It is evident that thicknesses outside of these exemplary ranges can be employed without departing from the spirit and scope of the invention.

Metal laminae which can be laminated together in the practice of this invention can be fashioned of the same or different materials such as, for example, aluminum and alloys of aluminum, iron and alloys of iron, tin plated metals such as tin plated steel, stainless steel, steel, copper and alloys of copper, magnesium, galvanized iron, terne plated steel, tin, and the like. The metal laminae can be of the same or different thicknesses the selection of which will depend upon the utility for the laminated product. Metal laminae which can be bonded together by the techniques of this invention can have a thickness of between about 0.3 mil and about 500 mils. It is to be understood that these thicknesses are exemplary only and metal laminae having thicknesses outside of this range can be used without departing from the spirit and scope of the invention.

Although the temperature of the metal and/or the temperature of the laminating rolls which are used to apply heat and pressure in accordance with that embodiment of the invention will depend upon such factors as the rate of travel between the nip of the rolls, the metals being laminated, the type of adhesive and type of inner layer in the structured film, as a general proposition the laminating rolls are heated to a temperature of between about 40° and about 1000°F.

While the invention has been described in connection with a structured film having an inner layer in the form of a substantially continuous layer disposed between each of the adhesive layers, the inner layer can also be in the form of a fabric material or a perforated strip disposed between the two adhesive layers. Fabrics which can be used in place of the substantially continuous inner layer include woven fabrics and non-woven fabrics fashioned of a thermoplastic material having a melting point at least about 25° F. greater than the melting point of the adhesive layers.

The following examples illustrate the invention as it is practiced to produce several specific laminates. It must be understood that these examples are for the purpose of illustration only and should not be construed as limiting of the invention.

EXAMPLE I

A structured film about 32 inches wide is produced by co-extruding high density polyethylene having a melting point of about 130°C and a random copolymer of ethylene and acrylic acid containing about 8 weight percent combined acrylic acid and having a melting point of about 102°C. The inner, polyethylene layer in the structured film has a thickness of about 2 mils and the outer copolymer layers each have a thickness of about 0.5 mil.

The structured film is passed over a series of cooling rolls to support the film and cool the several layers until they have solidified. The cooled film is then disposed between aluminum strips each about 2.5 mils thick and about 32 inches wide and the resulting composite fed continuously at a rate of about 25 feet per minute through the nip of a pair of opposed laminating rolls heated to a temperature of about 400°F. The space between the laminating rolls is adjusted to provide a pressure of about 50 psi on the outer surfaces of the aluminum strip. The heat and pressure imparted to the outer surfaces of the aluminum strip and the adhesive copolymer layers of the structured film cause a strong bond to form between the adhesive layers and the aluminum strip without destroying the integrity of the high density polyethylene layer in the structured film. The resulting laminate has uniform spacing between the metal laminae due primarily to the high density polyethylene layer. The laminate also possesses good sound attenuation properties.

EXAMPLE II

The technique described in Example I is repeated except the structured film is formed by co-extruding polypropylene and a copolymer of ethylene and methacrylic acid to provide the inner layer and the outer adhesive layers, respectively, in the structured film. A laminate having uniform spacing between the metal laminae is produced.

EXAMPLE III

A structured film is prepared by placing a 36 inch square sheet of chlorinated polyethylene having a thickness of about 8 mils between two sheets each about 36 inches square of an adhesive copolymer containing about 85 weight percent ethylene, about 9 weight percent ethyl acrylate, and about 6 weight percent acrylic acid. The adhesive copolymer sheets are each about 3 mils thick. The resulting composite is formed into a unitary structure by placing the composite between sheets of poly(tetrafluoroethylene) and the entire assembly placed between heated platens to bond the adhesive sheets to the chlorinated polyethylene sheet. The resulting structured sheet is then removed and placed between a 36 square inch sheet of copper about 12 mils thick and a 36 inch square sheet of tin-plated steel about 80 mils thick. This total assembly is then positioned between the platens of a hydraulic press which imparts a pressure of about 10 psi to the surfaces of the metal sheets. The platens are heated to impart a temperature of about 120°C to the adhesive copolymer thereby causing a strong bond to form between the adhesive layers and the metal sheets. The resulting laminate has good sound attenuation properties and uniform spacing between the metal laminae.

EXAMPLE IV

The technique of Example I is repeated except the structured film is made by extruding the adhesive layers on both sides of a non-woven fabric of nylon 66 filaments. The heat and pressure imparted to the structured film by the laminating rolls is of sufficient magnitude to cause the adhesive layers to form a strong bond with the metal laminae but is of insufficient magnitude to destroy the integrity of the individual filaments in the fabric. The laminate has uniform spacing between the metal laminae.

The laminates produced in accordance with this invention have utility in a variety of different fields for a multitude of different purposes. The laminates can be employed in the packaging industry as can stock for making containers and receptacles, in the construction industry for fabricating heating and cooling ducts, and in the automobile industry for fabricating interior and exterior parts for automobile bodies. The laminates are particularly suitable for fabricating fender panels, door panels, and floor panels in automobiles because the sound dampening properties which they possess are effective in attenuating road noise.

Although the invention has been described in considerable detail it is to be understood that such detail is for the purpose of illustration only and should not be construed as limiting of the invention.

What is claimed is:

1. A method of producing a laminate comprising metal laminae bonded together with an adhesive thermoplastic material and characterized by being free of metal-to-metal contact of the metal laminae, said method comprising disposing between at least two metal laminae a structured film comprising at least two outer adhesive layers and at least one inner layer of a thermoplastic material disposed between said adhesive layers, said inner layer having a melting point at least about 25° F. greater than the melting point of said adhesive layers, said adhesive layers being fashioned of a material selected from the group consisting of copolymers containing between about 60 and about 99.5 weight percent combined $\alpha$-olefin, between about 0.5 and about 25 weight percent combined $\alpha,\beta$-ethylenically unsaturated carboxylic acid, and up to about 39.5 weight percent of a material selected from the group consisting of alkyl esters of an $\alpha,\beta$-ethylenically unsaturated carboxylic acid and vinyl esters of a saturated carboxylic acid; and applying heat and pressure to said metal laminae of sufficient magnitude to effect a bond between said adhesive layers and said metal laminae but of insufficient magnitude to destroy the integrity of said inner layer disposed between said adhesive layers.

2. A method according to claim 1 wherein said heat is applied to said metal laminae before said pressure is applied.

3. A method according to claim 1 wherein said heat and pressure are applied simultaneously to said metal laminae.

4. A method according to claim 1 wherein said heat and pressure are applied to said metal laminae by passing said metal laminae and said structured film to a bonding zone comprising the nip formed between a pair of opposed laminating rolls.

5. A method according to claim 1 wherein said heat and pressure are applied to said metal laminae by passing said metal laminae and said structured film to a bonding zone comprising the platens of a press.

6. A method according to claim 1 wherein said metal laminae are fashioned of a metal selected from the group consisting of aluminum, tin plated steel, stainless steel, steel, copper, magnesium, galvanized iron, terne plated steel, and tin; and said inner layer in said structured film is fashioned of a material selected from the group consisting of high density polyethylene, polypropylene, copolymers of ethylene and propylene, nylon 6, nylon 66, and chlorinated polyethylene.

7. A method according to claim 1 wherein said metal laminae are aluminum, said adhesive layers in said structured film comprise a copolymer containing about 92 weight percent combined ethylene and about 8 weight percent combined acrylic acid, said inner layer comprises high density polyethylene, and said pressure is applied by passing said metal laminae and said structured film into the nip formed between a pair of opposed laminating rolls, said rolls being at a temperature of between about 40° and about 1,000°F.

8. A method according to claim 1 wherein said inner layer in said structured film is in the form of a substantially continuous layer disposed between each of said adhesive layers.

9. A method according to claim 1 wherein said inner layer in said structured film is in the form of a fabric selected from the group consisting of woven fabrics and non-woven fabrics disposed between each of said adhesive layers.

* * * * *